Patented Nov. 6, 1928.

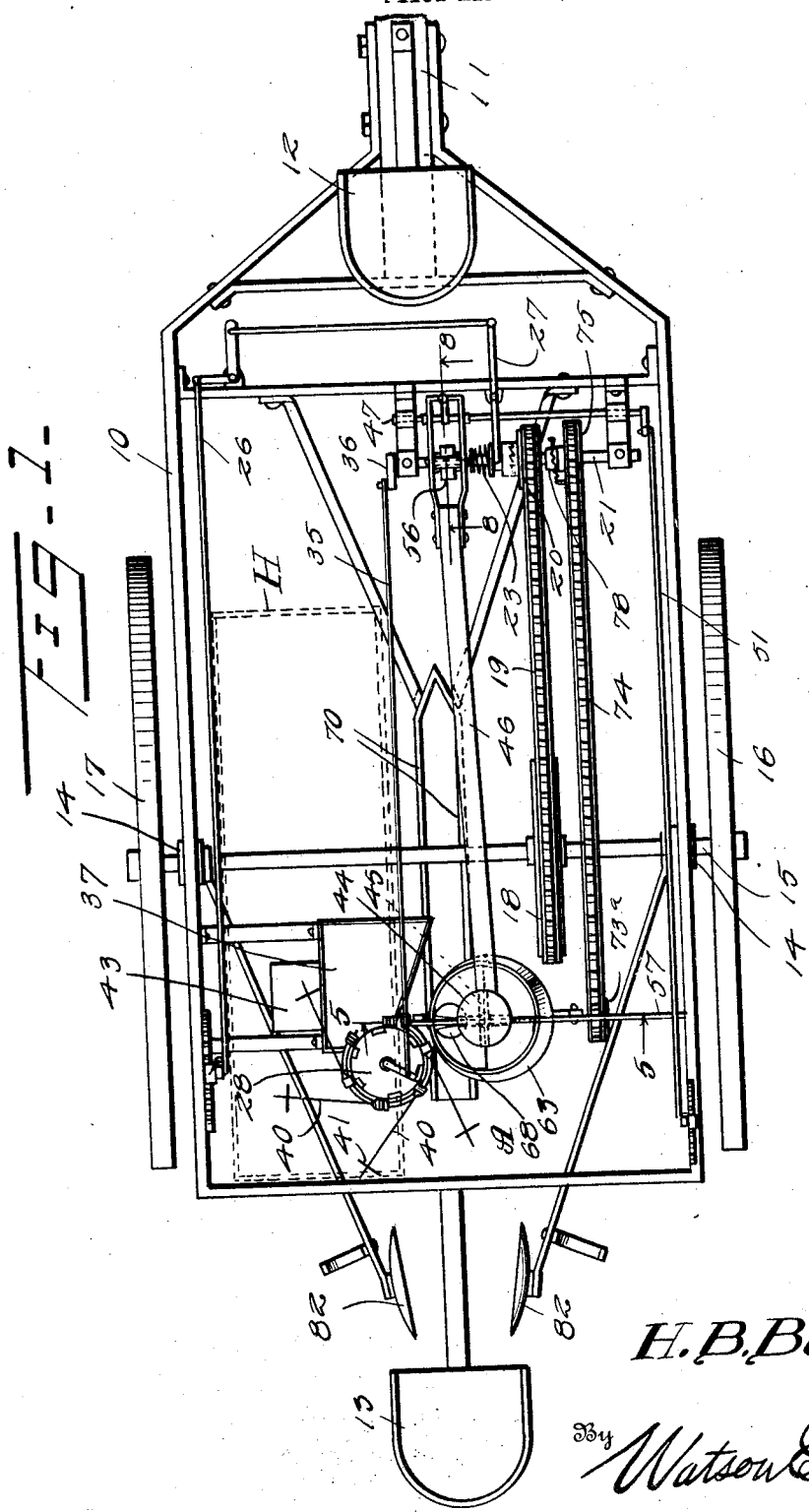

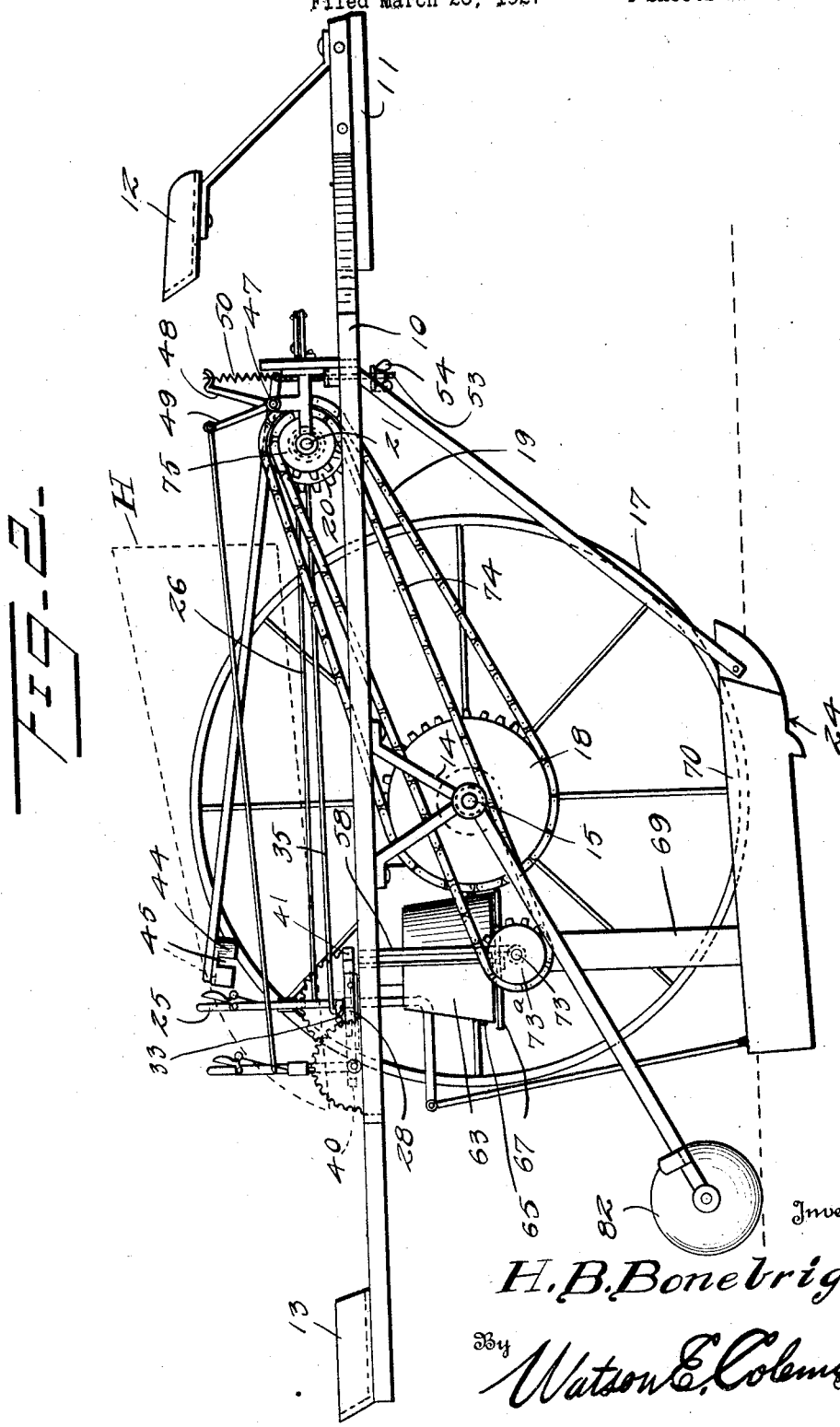

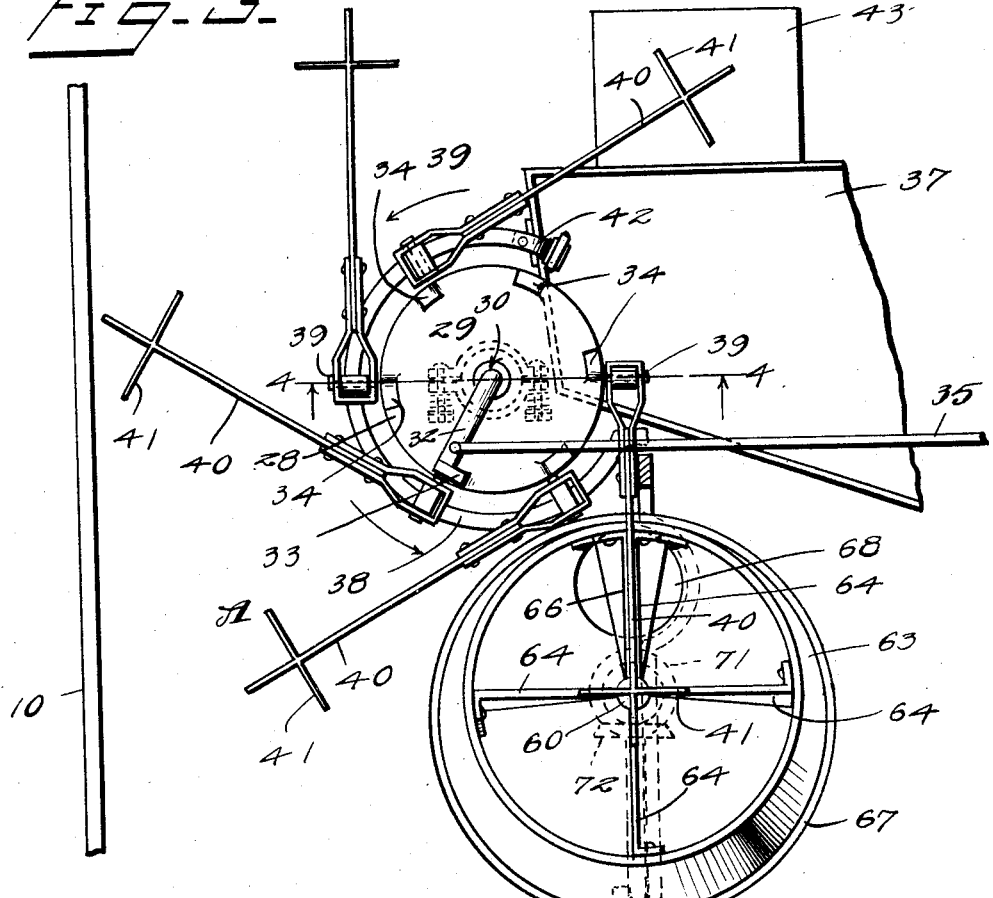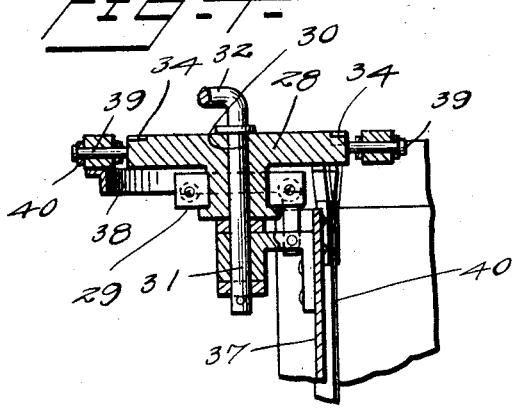

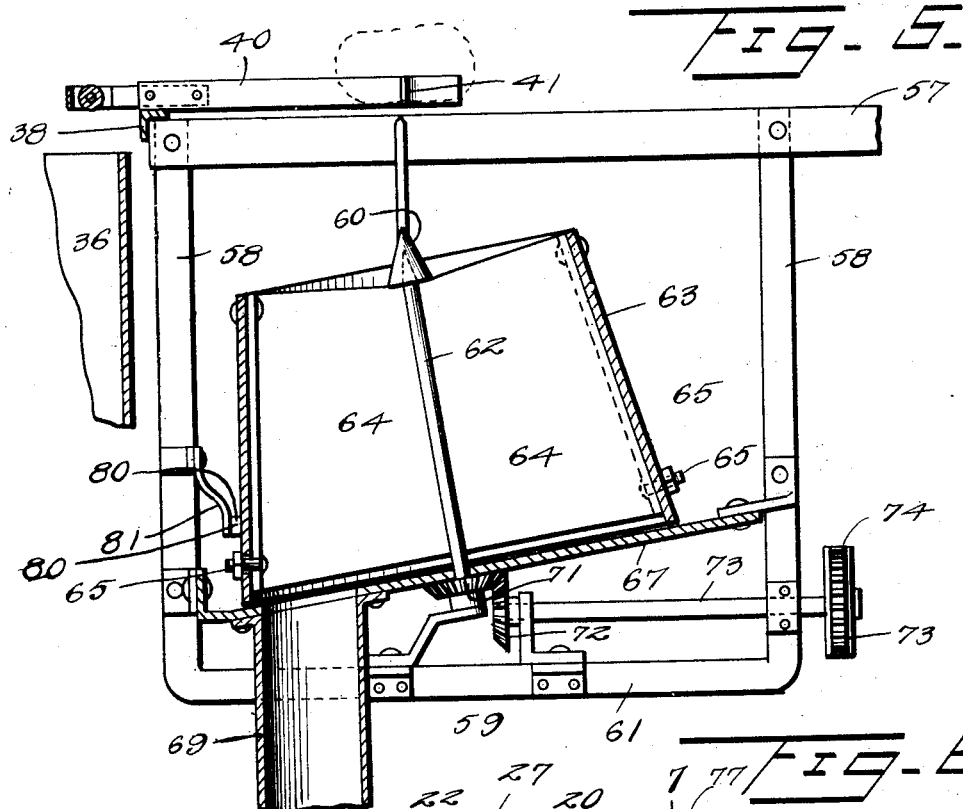
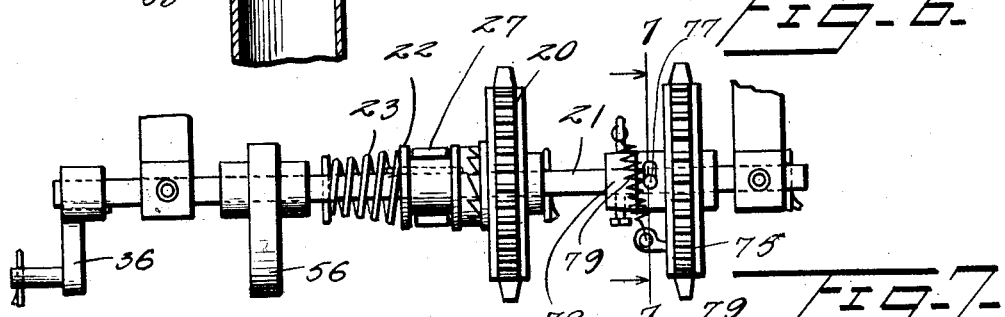
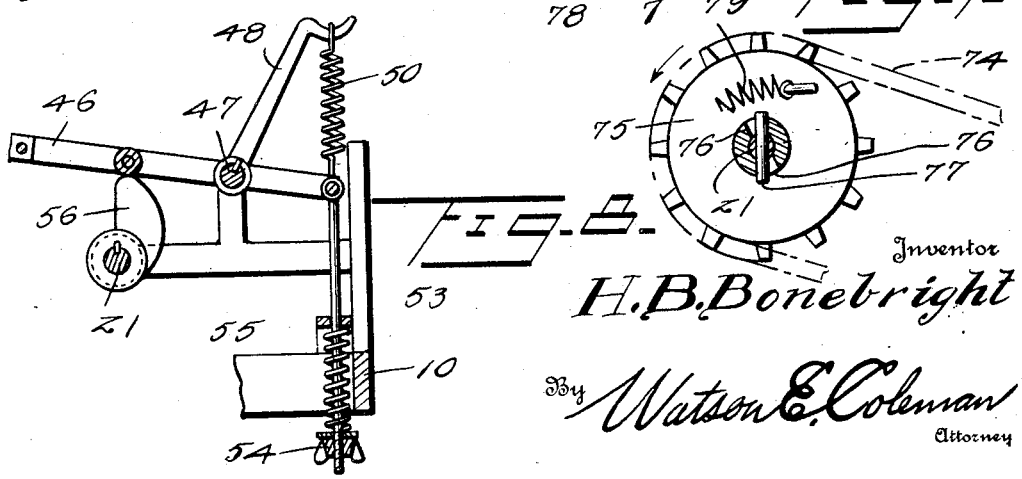

1,690,884

UNITED STATES PATENT OFFICE.

HERBERT B. BONEBRIGHT, OF CHINOOK, MONTANA.

PLANTER.

Application filed March 26, 1927. Serial No. 178,723.

This invention relates to an improvement in planters and more particularly to a device for planting potatoes.

An important object of the invention is to provide a device of this character embodying means for subdividing the potato into a plurality of sections and then successively planting these sections, operable to so plant the potatoes that the sections of one potato may be space-planted, with respect to the sections of a second potato.

A further object of the invention is to provide a device of this character embodying knives for subdividing the potatoes and means for operating the knives, whereby these knives are disinfected after each cutting operation to insure against transfer of diseases from one potato to another.

A further object of the invention is to provide a novel and improved mechanism for cutting the potatoes.

A still further object of the invention is to provide mechanism for feeding the cut potato sections to a planting shoe of such character that a space may be provided between the adjacent sections or not, as is desired.

These and other objects I attain by the construction shown in the accompanying drawings, wherein for the purpose of illustration is shown a preferred embodiment of my invention and wherein:—

Figure 1 is a plan view of a potato planter constructed in accordance with my invention;

Figure 2 is a side elevation thereof, one wall being removed;

Figure 3 is an enlarged plan of the distributer and knife mechanism;

Figure 4 is a section on the line 4—4 of Figure 3;

Figure 5 is a transverse sectional view through the distributer;

Figure 6 is a plan of the control shaft;

Figure 7 is a section on the line 7—7 of Figure 6;

Figure 8 is a section on the line 8—8 of Figure 1.

Referring now more particularly to the drawings, the numeral 10 generally designates a main frame having a tongue 11, whereby it may be drawn and having seat mountings 12 and 13 at the front and rear ends thereof. The frame provides bearings 14 for an axle 15, one end of which has a supporting wheel 16 secured thereto and the opposite end of which has a supporting wheel 17 rotatably mounted thereon. The axle 15 has secured thereto a sprocket 18 connected by a chain 19 with a sprocket 20 rotatably mounted upon a transversely extending shaft 21 carried by bearings supported from the forward end of the frame. Associated with the gear 20 is a shipper clutch 22 normally maintained in engaged position by a spring 23. Swung from the frame 10 is a planting shoe or furrow opener 24 movable into and out of engagement with the ground through suitable connections with a lever 25. Link and lever connections, generally designated at 26, between the lever 25 and the shifting fork 27 of the clutch 22, disengage the clutch from the gear, as the shoe 24 is lifted from the ground, thus stopping operation of the remaining mechanism, which is controlled from the shaft 21, as will hereinafter more clearly appear.

Supported from the frame, adjacent the rear end thereof and rotating horizontally is a disk 28. This disk has a hollow hub, which is surrounded by a spring-pressed band brake 29, which resists rotation of the disk. The disk 28 and its hub have an axial opening 30, in which is rotatably engaged a shaft 31, the upper end of which is provided with an angular arm 32 overlying the disk and having a dog 33. This dog coacts with circumferentially spaced teeth 34 carried by the disk 28 and the arm 32 is actuated through a link connection 35 with a crank 36 secured to the shaft 21. By rotation of the shaft, the disk 28 is given a step by step rotation with relatively long dwells between the steps.

Arranged beneath the disk and slightly to one side thereof is a tank 37 adapted to contain a disinfecting solution. A track 38, in the form of an interrupted annulus, is arranged, so that its opposite ends are adjacent the tank 37 and it is in surrounding relation to the disk 38, but arranged slightly below the level of radial pins 39 carried by the disk. Pivoted to each projecting pin is a knife blade 40 which, adjacent its free end, has a cutting cross arm 41, so that a potato driven upon the blade at the junction of the cross arm, will be subdivided into four sections. These blades, during the major portion of the rotation of the disk 28, ride upon the tracks 38. Arriving at the end of the track 38, they fall, by gravity, into the tank 37 and remain therein for the duration of one period between steps of the rotation of the disk. As the next succeeding step is taken, they come into engagement with a bumper 42 formed upon one end of the track 38 and are elevated thereby, so that they can ride upon the track. The edge of the tank adjacent that end of the track provided with the bumper 42, is preferably provided with a drip board 43 underlying the end of the blade, when elevated, and upon which any surplus disinfectant will drip and be returned to the tank 37. The blade remains in position over this drip board for the period intermediate to rotative steps of the disks.

Supported from the frame above the mechanism just described is a suitable hopper H, in which the potatoes which are to be planted will be disposed. In this hopper, the potatoes are conveniently located for access by an occupant of the seat 13 and as each blade 40 arrives at the position A, the operator removes the potato from the hopper and places it upon the knife with sufficient force to cause the potato to cling thereto. When the disk makes its next step, the potato so placed is moved beneath a plunger 44 having cross slots 45 in its face corresponding to the arrangement of the knife blades 40 and 41. This plunger is carried by the outer end of a lever 46 mounted upon a horizontal pivot 47 supported from the frame. This pivot is in the form of a rock shaft having arms 48 and 49 connected by a spring 50, with the forward end of the lever 46 and by a link 51 with a hand lever 52, respectively. It will be obvious that by shifting the hand lever 52 to different positions, the tension of the spring 50 may be regulated and thus the force with which the plunger 44 tends to engage the potato may be regulated.

Pivoted to the forward end of the lever and depending therefrom is a rod 53, the lower end of which has a threaded adjustment 54 providing a seat for a spring 55. The spring 55 operates as a rebound spring and tends to depress the forward end of the lever 46 sufficiently to disengage the plunger from the knives after the blow has been struck and thus permit the next step of rotation of the disk 28. The lever 46 extends over a cam 56 secured to the shaft 21 and accordingly rises and falls one for each rotation of this shaft.

The operation of the mechanism just described is as follows: As the shaft 21 rotates, a step by step rotation is imparted to the disk, which intermittently advances the knife blades. Each knife blade arriving at a predetermined position is supplied by the attendant with a potato which, when the blade arrives at its next position, is quartered by the impact of the plunger 44 therewith and caused to drop into a suitable distributing apparatus hereinafter described. In its next step, the knife leaves the track 38 and falls into the tank 37, where it is subjected to the action of disinfectant to insure against dissemination of disease from one potato to another. The next step withdraws the knife from the tank and places the same over the drain board to remove the excess disinfectant therefrom. In the construction at present illustrated, six steps are necessary to a complete rotation of the disk 28 and the two remaining steps merely serve to bring the knife to position at which it is again supplied with a potato by the attendant.

Extending transversely of the frame at such a point that it immediately underlies the knife blade, when positioned to be engaged by the plunger, is a relatively thin cross bar 57 from which a substantially U-shaped frame is suspended by its arms 58. Mounted in bearings 59 and 60 carried by the cross member 57 and the cross bar 61 of the U-shaped frame is a shaft 62. Secured to this shaft is a trunco-conical sleeve 63 having the larger end thereof downwardly disposed. Arranged within this sleeve are a plurality of radially extending partitions 64, the upper ends of which are secured both to the shaft 62 and to the sleeve 63. The lower ends of the outer edges of these partition walls are rotatably shiftable within the sleeve and are provided with adjustment locks 65 whereby they may be secured in adjusted positions. The bottoms of these partitions may be either disposed, so that they are 90° apart or so that they are approximately 72° apart. One of the partitions has associated therewith a false partition wall 66, the top of which is connected with the associated partition, so that it is inseparable therefrom and the bottom of which is adjustable in the same manner in which the partitions are adjusted, but in the opposite direction to the associated partition. This partition and the false partition wall may be shifted so that their lower ends are separated and a gap is formed therebetween from which materials deposited in the sleeve at the upper end thereof are excluded. The upper ends of aligned partitions at one point in the revolution of the sleeve align with the cross bar 57 and the knife blades 40 which are positioned for engagement by the plunger and at this time, the remaining vanes are aligned with the knife blade 41.

It will be obvious that if the plunger engages the potato while the sleeve is thus partitioned, the quarter sections formed from the potato will fall into the compartments formed between the partitions and thus be separated from one another. The shaft 62 is disposed at an angle to the vertical and immediately below the lower end of the sleeve 63, passes through a stationary plate 67 which is perpendicular thereto. This plate has an opening 68 and a chute 69 extends from the bottom of the plate at the opening to the space between the wings 70 of the furrow opener or shoe 24. Immediately below the plate 67, the shaft 62 has a gear 71 secured thereto, this gear meshing with a gear 72 carried by a horizontal shaft 73, which is likewise provided with a sprocket 73ª. The sprocket 73ª is connected by a chain 74 and a sprocket 75, the hub of which has connection at 76 with the shaft 21 in such manner that the gear may partake of a limited rotation with relation to the shaft. After the gear has been rotated for this distance, the pin 77 of the connection positively checks rotation and forces the sprocket to rotate with the shaft 21. Secured to the shaft 21 adjacent the hub of the gear is a fixed collar 78 which is connected with the gear by a spring 79, which constantly urges the gear to rotate about the shaft in the same direction that the shaft is rotating.

Secured to the periphery of the sleeve 63 are four cams 80, which, as the aligned partitions 64 of the sleeve align with the cross bar 57, come into engagement with a spring arm 81 forming a retention clutch resisting rotation of the sleeve. This holds the sleeve stationary momentarily against the drive of the chain 74, so that a slight pause in the rotation of the sleeve is provided, during which the plunger may engage the potato and drive the sections thereof into the compartments of the sleeve. As the tension of the spring 79 increases, it will overcome the tension of the clutch spring 81 and rotation of the sleeve will continue. In event the spring 79 fails to overcome action of the spring 81, the pin 77 will provide a positive engagement, insuring the continued rotation. Just as soon as the sleeve is freed from the clutch spring 81, the spring 79 will again advance the sprocket 75 to its normal position.

It will be obvious that the potatoes inserted in the compartments of the sleeve will rest upon the disk 67 and will be pushed by the partitions therealong until they align with the opening 68 of this disk when they will fall through the sleeve 69 into the furrow formed by the furrow opener. If the false partition wall 66 is arranged against its partition wall, the potatoes will be uniformly spaced, but if separated therefrom, a gap will be left between the plantings of the sections of one potato and the plantings of the succeeding potato. Furrow closers 82 will, of course, be provided for covering the potatoes deposited in the furrow. In the present instance, these are shown as under the control of the feet of an operator occupying the seat 13.

Since it will be obvious that the construction hereinbefore set forth is capable of a certain range of change and modification without materially departing from the spirit of the invention, I do not limit myself to such specific structure except as hereinafter claimed.

I claim:—

1. In a potato planter, means for dividing the potatoes into sections comprising a plurality of knives and means for successively positioning the knives for the cutting operation and means for disinfecting each knife after the cutting operation.

2. In a potato planter, means for cutting potatoes into a plurality of sections including a plurality of knives and means for successively positioning the knives for the cutting operation, a disinfectant vat and means for submerging the cutting portion of each knife in the disinfectant in the vat after each cutting operation.

3. In a potato planter, a plurality of cutting knives, a disinfectant vat and means for successively positioning each knife for the cutting operation and introducing the knife to the vat.

4. In a potato planter, a plurality of cutting knives, a vat, a drain board draining to the vat and means for successively positioning each knife for the cutting operation, inserting the knife in the vat and positioning the knife over said drain board.

5. In a potato planter, a plurality of cutting knives, a disinfectant vat, a plunger, and means for successively positioning each knife to receive a potato to be cut, positioning the knife with the potato affixed thereto beneath the plunger to be engaged thereby to cut the potato and introducing the knife to the disinfectant vat.

6. In a potato planter, a rotatable element bearing knives adapted to receive a potato to be cut, means for imparting a step by step rotation to the element to successively bring the knives to a predetermined position and a reciprocating plunger engaging the potato carried by each knife while in said position to force the potatoes upon the knife, so that they are cut thereby.

7. In a potato planter, a rotatable element bearing knives adapted to receive a potato to be cut, means for imparting a step by step rotation to the element to successively bring the knives to a predetermined position, a reciprocating plunger engaging the potato carried by each knife while in said position to force the potatoes upon the knife, so that they are cut thereby and a disinfectant vat into which the knife extends during the step of its rotation succeeding that where it coacts with the plunger.

8. In a potato planter, a rotatable element bearing knives, means for imparting a step by step rotation to the element, potatoes being applied to said knives during one step of the rotation, a plunger engaging the potato carried by the knife at the completion of the next step to subdivide the potato and a vat into which the knife extends at the completion of the next step of rotation.

9. In a potato planter, a rotatable element, a plurality of knives pivoted thereto to swing in vertical planes, a track surrounding the rotatable element against which the knives bear to be supported thereby in horizontal position, said track having a gap formed therein, a vat positioned beneath said gap to receive the knife as it drops from the track, means for withdrawing the knife from the vat and repositioning it upon the track and means for applying a step by step rotation to the member.

10. In a potato planter, a rotatable element, a plurality of knives pivoted thereto to swing in vertical planes, a track surrounding the rotatable element against which the knives bear to be supported thereby in horizontal position, said track having a gap formed therein, a vat positioned beneath said gap to receive the knife as it drops from the track, means for withdrawing the knife from the vat and repositioning it upon the track, means for applying a step by step rotation to the member and a drain board secured to the vat and draining thereinto over which each knife is positioned by the step of rotation of the member in which the knife is withdrawn from the vat and again engaged with said track.

11. In a potato planter, a rotatable element, a plurality of knives pivoted thereto to swing in vertical planes, a track surrounding the rotatable element against which the knives bear to be supported thereby in horizontal position, said track having a gap formed therein, a vat positioned beneath said gap to receive the knife as it drops from the track, means for withdrawing the knife from the vat and repositioning it upon the track, means for applying a step by step rotation to the member, and a plunger oscillating in a vertical plane and engaging each knife as it arrives at a predetermined position to thereby force a potato carried thereby downwardly upon the knife to be cut.

12. In a potato planter, a rotatable element, a plurality of knives pivoted thereto to swing in vertical planes, a track surrounding the rotatable element against which the knives bear to be supported whereby in horizontal position, said track having a gap formed therein, a vat positioned beneath said gap to receive the knife as it drops from the track, means for withdrawing the knife from the vat and repositioning it upon the track, means for applying a step by step rotation to the member, a plunger oscillating in a vertical plane and engaging each knife as it arrives at a predetermined position to thereby force a potato carried thereby downwardly upon the knife to be cut, and a spring cushioning downward movement of the plunger and elevating the plunger after completion of the stroke thereof to disengage the plunger from the knife and permit continued movement thereof.

13. In a potato planter, a rotatable element bearing knives adapted to receive a potato to be cut, means for imparting a step by step rotation to the element to successively bring the knives to a predetermined position and a reciprocating plunger engaging the potato carried by each knife while in said position to force the potatoes upon the knife, so that they are cut thereby, the spring cushioning movement of the plunger into engagement with the knives and withdrawing the plunger from the knives upon completion of the operating stroke thereof to permit the knives to continue their movement.

In testimony whereof I hereunto affix my signature.

HERBERT B. BONEBRIGHT.